(12) United States Patent
Yu

(10) Patent No.: US 9,785,300 B2
(45) Date of Patent: Oct. 10, 2017

(54) TOUCH DETECTION METHOD AND DEVICE

(71) Applicant: Spreadtrum Communications (Shanghai) Co., Ltd., Shanghai (CN)

(72) Inventor: Huawei Yu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/239,921

(22) PCT Filed: Jun. 5, 2013

(86) PCT No.: PCT/CN2013/076800
§ 371 (c)(1),
(2) Date: Feb. 20, 2014

(87) PCT Pub. No.: WO2014/194497
PCT Pub. Date: Dec. 11, 2014

(65) Prior Publication Data
US 2016/0162078 A1    Jun. 9, 2016

(51) Int. Cl.
*G06F 3/045*     (2006.01)
*G06F 3/041*     (2006.01)

(52) U.S. Cl.
CPC ............ *G06F 3/045* (2013.01); *G06F 3/0416* (2013.01); *G06F 2203/04104* (2013.01)

(58) Field of Classification Search
CPC ......... G06F 2203/04104; G06F 3/0416; G06F 3/045
(Continued)

(56) References Cited

U.S. PATENT DOCUMENTS

| 2003/0063073 A1* | 4/2003 | Geaghan .............. G06F 3/0416 345/173 |
| 2005/0046621 A1* | 3/2005 | Kaikuranta ......... G06F 3/03547 345/173 |

(Continued)

FOREIGN PATENT DOCUMENTS

| CN | 102520835 A | 6/2012 |
| CN | 102576277 A | 7/2012 |

(Continued)

OTHER PUBLICATIONS

European Search Report for International Application No. 13194227.8-1507; Dated May 14, 2014.
(Continued)

*Primary Examiner* — Dmitriy Bolotin
(74) *Attorney, Agent, or Firm* — Cantor Colburn LLP

(57) ABSTRACT

A touch detection method and device are provided. The method includes: obtaining coordinates of a point associated with touch points; obtaining distances between the touch points in a direction of an axis to be measured; determining indeterminate coordinates of the touch points based on the coordinates of the point associated with the touch points and the distances between the touch points in the direction of the axis to be measured; and determining actual coordinates of the touch points according to the indeterminate coordinates of the touch points. The device includes: an associated point determining unit, adapted for obtaining coordinates of a point associated with touch points; a distance determining unit, adapted for obtaining distances between the touch points in a direction of an axis to be measured; an indeterminate coordinate determining unit, adapted for determining indeterminate coordinates of the touch points based on the coordinates of the point associated with the touch points and the distances between the touch points in the direction of the axis to be measured; and an actual coordinate determining
(Continued)

unit, adapted for determining actual coordinates of the touch points according to the indeterminate coordinates of the touch points.

22 Claims, 9 Drawing Sheets

(58) Field of Classification Search
USPC .................................................. 345/173, 174
See application file for complete search history.

(56) References Cited

U.S. PATENT DOCUMENTS

| | | | | |
|---|---|---|---|---|
| 2006/0026536 A1* | 2/2006 | Hotelling | | G06F 3/0418 |
| | | | | 715/863 |
| 2009/0109191 A1* | 4/2009 | Felder | | G06F 3/045 |
| | | | | 345/174 |
| 2009/0189877 A1* | 7/2009 | Washino | | G06F 3/045 |
| | | | | 345/174 |
| 2009/0322700 A1* | 12/2009 | D'Souza | | G06F 3/045 |
| | | | | 345/174 |
| 2009/0322701 A1* | 12/2009 | D'Souza | | G06F 3/045 |
| | | | | 345/174 |
| 2010/0066701 A1* | 3/2010 | Ningrat | | G06F 3/044 |
| | | | | 345/174 |
| 2010/0117974 A1* | 5/2010 | Joguet | | G06F 3/0414 |
| | | | | 345/173 |
| 2010/0214231 A1* | 8/2010 | D'Souza | | G06F 3/0416 |
| | | | | 345/173 |
| 2010/0295815 A1* | 11/2010 | Zhang | | G06F 3/045 |
| | | | | 345/174 |
| 2010/0295816 A1* | 11/2010 | Zhang | | G06F 3/045 |
| | | | | 345/174 |
| 2011/0043462 A1* | 2/2011 | Shabra | | G06F 3/045 |
| | | | | 345/173 |
| 2011/0102464 A1* | 5/2011 | Godavari | | G06F 3/0416 |
| | | | | 345/650 |
| 2012/0068969 A1* | 3/2012 | Bogana | | G06F 3/045 |
| | | | | 345/174 |
| 2012/0075235 A1* | 3/2012 | Hong | | G06F 3/0416 |
| | | | | 345/174 |
| 2012/0262417 A1* | 10/2012 | Wakasugi | | G06F 3/0416 |
| | | | | 345/174 |
| 2014/0111477 A1* | 4/2014 | Lv | | G06F 3/045 |
| | | | | 345/174 |

FOREIGN PATENT DOCUMENTS

| | | |
|---|---|---|
| WO | 2009038277 A1 | 3/2009 |
| WO | 2012073261 A1 | 6/2012 |

OTHER PUBLICATIONS

International Search Report for International Patent Application No. PCT/CN2013/076800, dated Mar. 6, 2014. English Translation not available.

* cited by examiner

TOUCH DETECTION METHOD AND DEVICE

This is the U.S. national stage of application No. PCT/CN2013/076800, filed on 5 Jun. 2013, the disclosure of which is also incorporated herein by reference.

FIELD OF THE DISCLOSURE

The present disclosure generally relates to a touch detection method and device, and more particularly, to a method and device for detecting a resistive touch screen.

BACKGROUND OF THE DISCLOSURE

A resistive touch screen is a sensor that translates a physical location of a touch at a point (X, Y) in a rectangular area into a voltage that represents the X and Y value. Such a screen can use four wires, five wires, seven wires or eight wires for generating screen-bias voltages and reading back the voltage at the touch point.

FIG. 1 schematically illustrates a structural diagram of a resistive touch screen. The resistive touch screen includes a first resistive layer 11 and a second resistive layer 12. A first electrode X1 and a second electrode X2, which are parallel with each other, are disposed on two opposite edges of the first resistive layer 11 respectively. A third electrode Y1 and a fourth electrode Y2, which are parallel with each other, are disposed on two opposite edges of the second resistive layer 12 respectively. The third electrode Y1 and the fourth electrode Y2 are perpendicular to the first electrode X1 and the second electrode X2.

When the resistive touch screen suffers a stress strong enough from single-touch, the first resistive layer 11 may be brought into contact with the second resistive layer 12, where an equivalent circuit is illustrated in FIG. 2. The resistance from the first electrode X1 to a contact point between the two resistive layers is equivalent to a resistor R10, the resistance from the second electrode X2 to the contact point between the two resistive layers is equivalent to a resistor R20, the resistance from the third electrode Y1 to the contact point between the two resistive layers is equivalent to a resistor R30, the resistance from the fourth electrode Y2 to the contact point between the two resistive layers is equivalent to a resistor R40, and the single-contact resistance between the first resistive layer 11 and the second resistive layer 12 is equivalent to a contact resistor Rt. In order to measure a coordinate of the touch point in a certain direction on the resistive touch screen, it is necessary to bias one of the two resistive layers. Specifically, a biasing process may include: connecting the first electrode X1 to a reference voltage, connecting the second electrode X2 to ground, and connecting the third electrode Y1 or the fourth electrode Y2 to an input terminal of an Analog-to-Digital Converter (ADC). In this manner, a resistive surface of the first resistive layer 11 is divided into the resistor R10 and the resistor R20 in a direction of X-axis. The voltage of resistor R20 is proportional to a distance between the touch point and the second electrode X2. Thus, an X coordinate of the touch point may be calculated. Similarly, by biasing the second resistive layer 12 and reading the voltage of the first electrode X1 or the second electrode X2, a Y coordinate of the touch point may be calculated as well. However, when there is more than one touch point, none coordinates of the touch points can be obtained by the above methods.

A resistive touch screen which can identify multi-touch points is provided in a PCT patent publication No. WO2009/038277A1. The resistive touch screen includes a first resistive detection pattern and a second resistive detection pattern, both of which have a plurality of parallel stripes. The plurality of parallel stripes in the first resistive detection pattern are perpendicular to those in the second resistive detection pattern. And voltages are alternately applied to some stripes of the first resistive detection pattern and the second resistive detection pattern which are touched to obtain X and Y coordinates.

However, when the above resistive touch screen is employed to detect multi-touch points, the structure of the touch screen needs to be changed, which increases the cost of manufacturing the touch screen.

SUMMARY

Embodiments of the present disclosure are directed to realize detecting multi-touch points.

In one embodiment, a touch detection method may be provided, including:

obtaining coordinates of a point associated with touch points;

obtaining distances between the touch points in a direction of an axis to be measured;

determining indeterminate coordinates of the touch points based on the coordinates of the point associated with the touch points and the distances between the touch points in the direction of the axis to be measured; and determining actual coordinates of the touch points according to the indeterminate coordinates of the touch points.

Optionally, the number of the touch points is two and the coordinates of the point associated with the touch points may include a coordinate on a first axis and a coordinate on a second axis.

The coordinate on the first axis may be obtained based on at least one of a first coordinate and a second coordinate, where the first coordinate is relevant to the voltage of an electrode on a second resistive layer of a touch screen when a first resistive layer of the touch screen is biased, and the second coordinate is relevant to the voltage of another electrode on the second resistive layer when the first resistive layer is biased.

The coordinate on the second axis may be obtained based on at least one of a third coordinate and a fourth coordinate, where the third coordinate is relevant to the voltage of an electrode on the first resistive layer when the second resistive layer is biased and the fourth coordinate is relevant to the voltage of another electrode on the first resistive layer when the second resistive layer is biased.

In one embodiment, a touch detection device may be provided, including:

an associated point determining unit, adapted for obtaining coordinates of a point associated with touch points;

a distance determining unit, adapted for obtaining distances between the touch points in a direction of an axis to be measured;

an indeterminate coordinate determining unit, adapted for determining indeterminate coordinates of the touch points based on the coordinates of the point associated with the touch points and the distances between the touch points in the direction of the axis to be measured; and an actual coordinate determining unit, adapted for determining actual coordinates of the touch points according to the indeterminate coordinates of the touch points.

Compared with the conventional solutions, the present disclosure may have following advantages. In the present disclosure, detection of two touch points may be realized in a common resistive screen, thereby reducing the cost of a common resistive touch screen which can identify two touch points. Besides, an indicator signal may be generated based on variation of a detected touch point to indicate performing operations, such as zooming in, zooming out and rotation, thereby realizing indicating operations through two-point touch in a common resistive touch screen.

DETAILED DESCRIPTION OF THE DISCLOSURE

In order to clarify the objects, characteristics and advantages of the disclosure, embodiments of present disclosure will be described in detail in conjunction with accompanying drawings.

In following embodiments, when a resistor cannot correspond to a definite actual resistor, the resistor may be an equivalent resistor.

Figure 1:
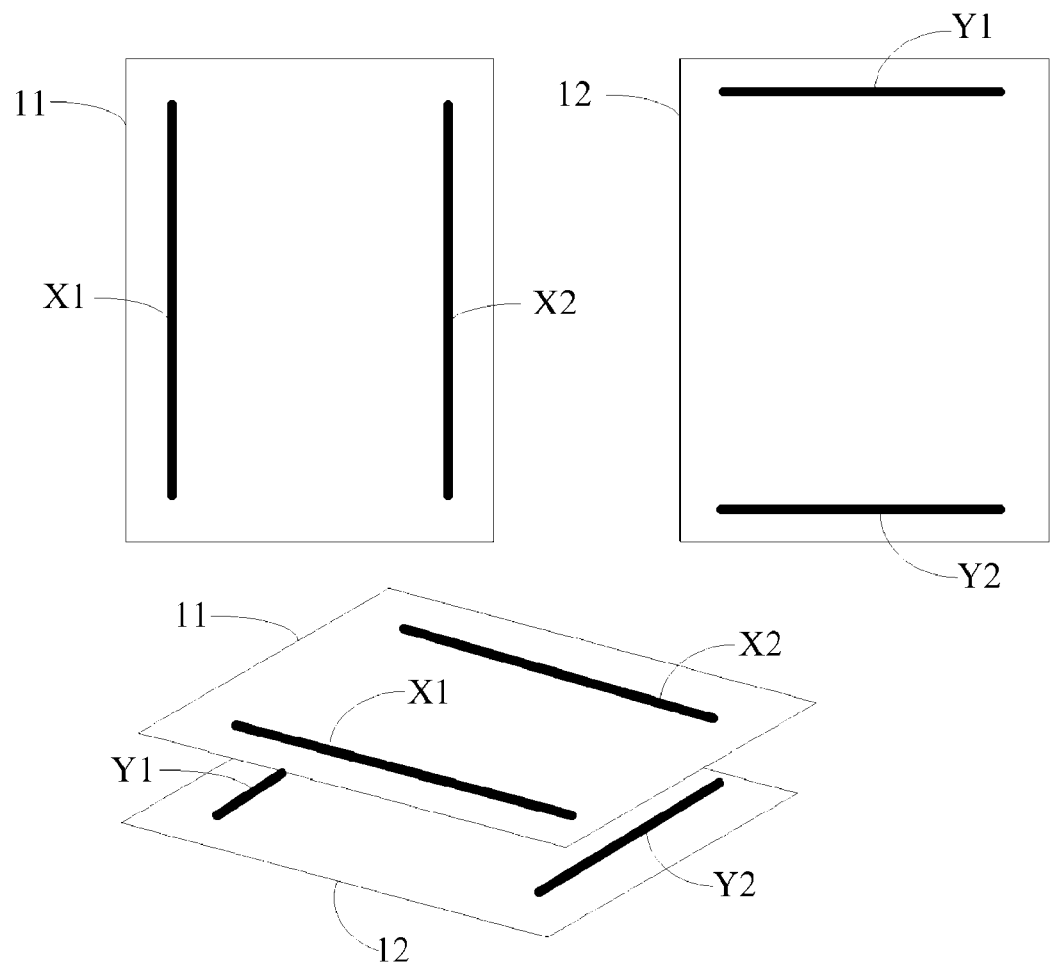
FIG. 1 schematically illustrates a structural diagram of a resistive touch screen.
Figure 2:
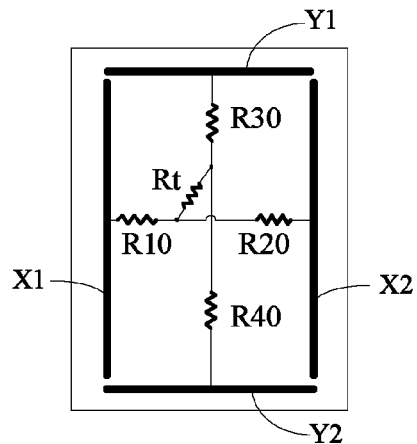
FIG. 2 schematically illustrates an equivalent circuit of a resistive touch screen having single point being touched.
Figure 3:
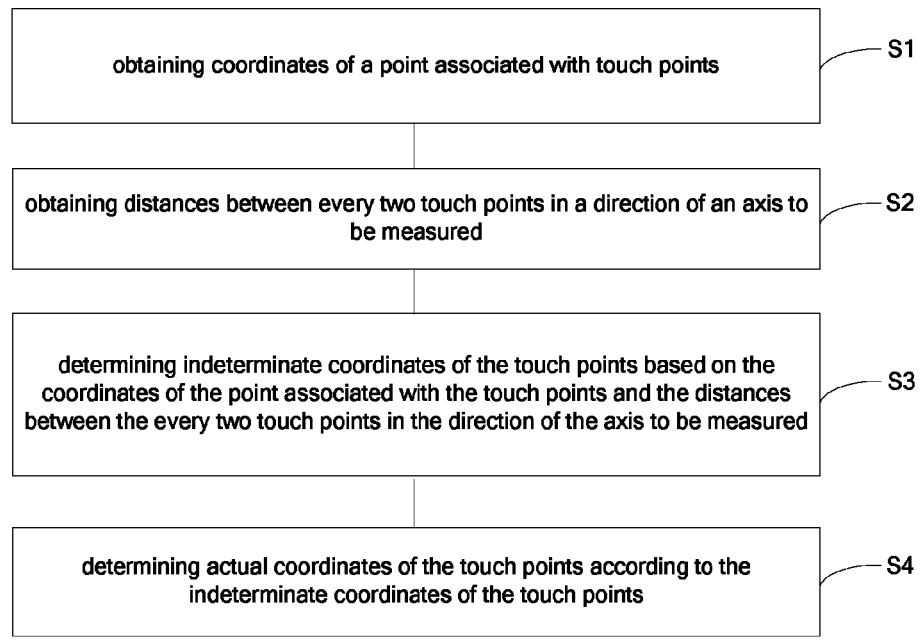
FIG. 3 schematically illustrates a flow chart of a touch detection method according to one embodiment of the present disclosure.

Referring to FIG. 3, in one embodiment, a touch detection method is provided, including:

S1, obtaining coordinates of a point associated with touch points;

S2, obtaining distances between every two touch points in a direction of an axis to be measured;

S3, determining indeterminate coordinates of the touch points based on the coordinates of the point associated with the touch points and the distances between the every two touch points in the direction of the axis to be measured; and S4, determining actual coordinates of the touch points according to the indeterminate coordinates of the touch points.

The coordinates of the point associated with the touch points may be coordinates of the center of all the touch points and may be measured by equaling multiple touch points to a single touch point.

Hereafter, two points on a touch screen being touched is taken as an example to further explain the above steps.

In S1, the coordinates of the point associated with the touch points may include a coordinate on a first axis and a coordinate on a second axis. The coordinate on the first axis may be obtained based on at least one of a first coordinate and a second coordinate. The first coordinate is relevant to the voltage of an electrode on a second resistive layer of a touch screen when a first resistive layer of the touch screen is biased, and the second coordinate is relevant to the voltage of another electrode on the second resistive layer when the first resistive layer is biased. The coordinate on the second axis may be obtained based on at least one of a third coordinate and a fourth coordinate. The third coordinate is relevant to the voltage of an electrode on the first resistive layer when the second resistive layer is biased and the fourth coordinate is relevant to the voltage of another electrode on the first resistive layer when the second resistive layer is biased.

Figure 4:
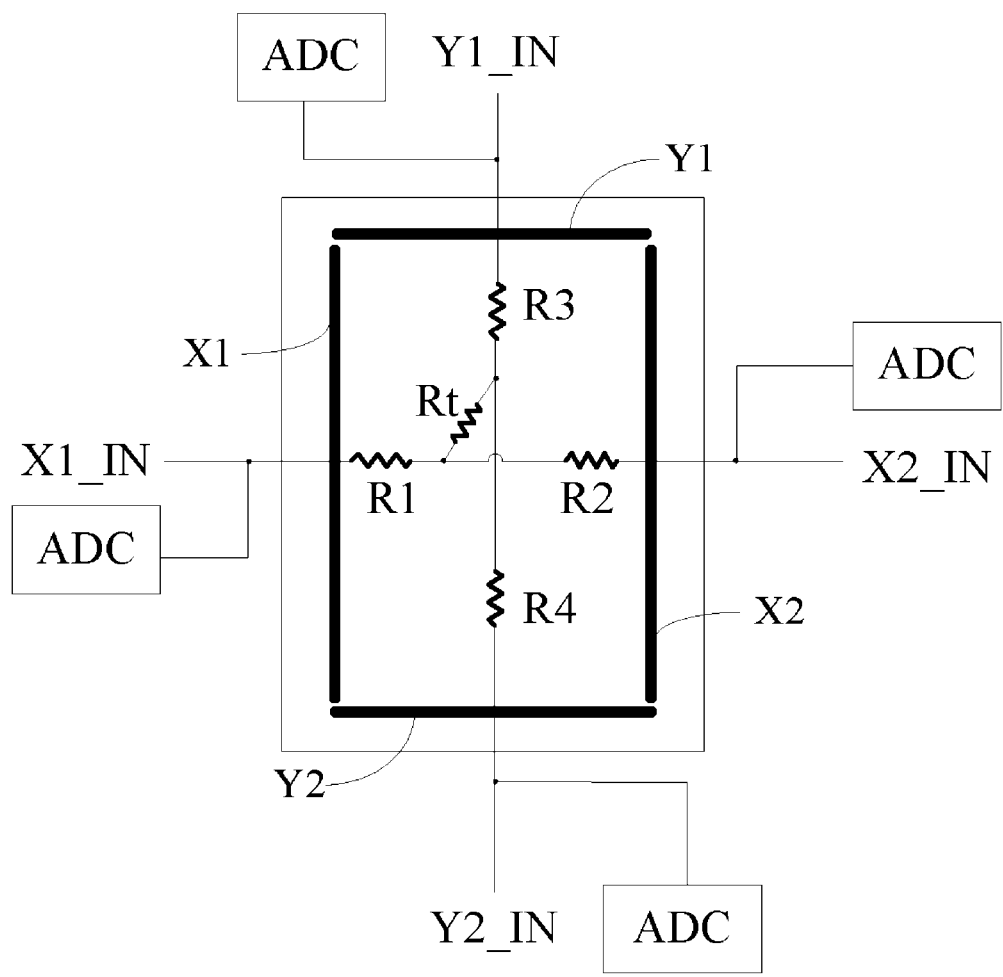
FIG. 4 schematically illustrates an equivalent circuit of a touch screen according to one embodiment of the present disclosure.

Referring to FIG. 4, specifically, a resistive touch screen includes a first resistive layer and a second resistive layer. A first electrode X1 and a second electrode X2, which are parallel with each other, are disposed on two opposite edges of the first resistive layer respectively. A third electrode Y1 and a fourth electrode Y2, which are parallel with each other, are disposed on two opposite edges of the second resistive layer respectively. The third electrode Y1 and the fourth electrode Y2 are perpendicular to the first electrode X1 and the second electrode X2.

When two points on the touch screen are touched, the resistance between a point associated with the two points (called 'the associated point' thereafter) and the first electrode X1 is equivalent to a first resistor R1 on the first resistive layer, the resistance between the associated point and the second electrode X2 is equivalent to a second resistor R2 on the first resistive layer, the resistance between the associated point and the third electrode Y1 is equivalent to a third resistor R3 on the second resistive layer, the resistance between the associated point and the fourth electrode Y2 is equivalent to a fourth resistor R4 on the second resistive layer, the contact resistance of the associated point between the first and second resistive layers is equivalent to a contact resistor Rt which is disposed between the first resistor R1 and the third resistor R3 and connected with them.

Biasing a resistive layer may include: applying a first voltage on an electrode on the first or second resistive layer; and applying a second voltage on another electrode on the first or second resistive layer, where the first voltage is larger than the second voltage. In some embodiments, the first voltage may be at a high level greater than 0V and the second voltage may be a ground voltage equaling to 0V.

In some embodiments, biasing the first resistive layer may include: connecting the first electrode X1 to a high level through a first drive pin X1_IN; and connecting the second electrode X2 to ground through a second drive pin X2_IN.

To obtain an X coordinate Xc of the associated point, the third electrode Y1 may be connected to an input terminal of an Analog-to-Digital Converter (ADC) and drive pins may be set to the high impedance state, for example, a third drive pin Y1_IN connected with the third electrode Y1 and a fourth drive pin Y2_IN connected with the fourth electrode Y2 may be set to the high impedance state. Since the voltage of the third electrode Y1 measured by the ADC is proportional to the distance between the associated point and the second electrode X2, a first coordinate Xc1 of the associated point may be obtained.

In other embodiments, the fourth electrode Y2 may be connected with the input terminal of the ADC and the drive pins may be set to the high impedance state, for example, the third drive pin Y1_IN connected with the third electrode Y1 and the fourth drive pin Y2_IN connected with the fourth electrode Y2 may be set to the high impedance state. Since the voltage of the fourth electrode Y2 measured by the ADC is proportional to the distance between the associated point and the second electrode X2, a second coordinate Xc2 of the associated point may be obtained.

Both the first coordinate Xc1 and the second coordinate Xc2 can serve as the X coordinate Xc of the associated point.

The first coordinate Xc1 and the second coordinate Xc2 may be different due to different touch positions of a finger on the touch screen. Therefore, the voltages of the third electrode Y1 and the fourth electrode Y2 may be both measured by connecting the third electrode Y1 and the fourth electrode Y2 to two input terminals of the ADC, respectively, so that the first coordinate Xc1 and the second coordinate Xc2 may be calculated. To reduce the error of the X coordinate Xc of the associated point, an average value of the first coordinate Xc1 and the second coordinate Xc2 may be taken as the X coordinate Xc of the associated point.

Similarly, biasing the second resistive layer may include: connecting the third electrode Y1 to a high level through the third drive pin Y1_IN; and connecting the fourth electrode Y2 to ground through the fourth drive pin Y2_IN.

To obtain a Y coordinate Yc of the associated point, the first electrode X1 may be connected to an input terminal of the ADC and drive pins may be set to the high impedance state, for example, the first drive pin X1_IN connected with the first electrode X1 and the second drive pin X2_IN connected with the second electrode X2 may be set to the high impedance state. Since the voltage of the first electrode X1 measured by the ADC is proportional to the distance between the associated point and the fourth electrode Y2, a third coordinate Yc1 of the associated point may be obtained.

In other embodiments, the second electrode X2 may be connected with an input terminal of the ADC and the drive pins may be set to the high impedance state, for example, the first drive pin X1_IN connected with the first electrode X1 and the second drive pin X2_IN connected with the second electrode X2 may be set to the high impedance state. Since the voltage of the second electrode X2 measured by the ADC is proportional to the distance between the associated point and the fourth electrode Y2, a fourth coordinate Yc2 of the associated point may be obtained.

Both the third coordinate Yc1 and the fourth coordinate Yc2 can serve as the Y coordinate Yc of the associated point.

The third coordinate Yc1 and the fourth coordinate Yc2 may be different due to different touch positions of a finger on the touch screen. Therefore, the voltages of the first electrode X1 and the second electrode X2 may be both measured by connecting the first electrode X1 and the second electrode X2 to the two input terminals of the ADC, respectively, so that the third coordinate Yc1 and the fourth coordinate Yc2 may be calculated. To reduce the error of the Y coordinate Yc of the associated point, an average value of the third coordinate Yc1 and the fourth coordinate Yc2 may be taken as the Y coordinate Yc of the associated point.

When two points of the touch screen are touched at the same time, (Xc, Yc) may be taken as coordinates of a center point between the two points.

In practical measurement, electrodes that need to be connected to an ADC may be connected to different input terminals of a same ADC or connected to different ADCs.

In S2, obtaining distances between every two touch points in a direction of an axis to be measured may include: measuring a voltage or current of an external resistor on each of the two resistive layers, respectively, or measuring a voltage or current between electrodes on each of the two resistive layers, respectively, so as to obtain resistance variations of the touch screen in directions of a first axis and a second axis; and determining the distances between the two touch points in the directions of the first axis and the second axis based on the resistance variations of the touch screen in the directions of the first axis and the second axis, respectively.

The resistance variations of the touch screen in the directions of the first axis and the second axis may include: a resistance variation $\Delta Rx$ of the touch screen in the direction of the X-axis and a resistance variation $\Delta Ry$ of the touch screen in the direction of the Y-axis.

Specifically, the voltage or the current of an external resistor connected with an electrode on a resistive layer is measured to obtain the resistance of the touch screen in a direction of the first axis or the second axis when the touch screen is touched. The difference between the resistances of the touch screen in the direction of the first axis or the second axis when the touch screen is touched and not touched may be taken as the resistance variation of the touch screen in the direction of the first axis or the second axis.

Figure 5:
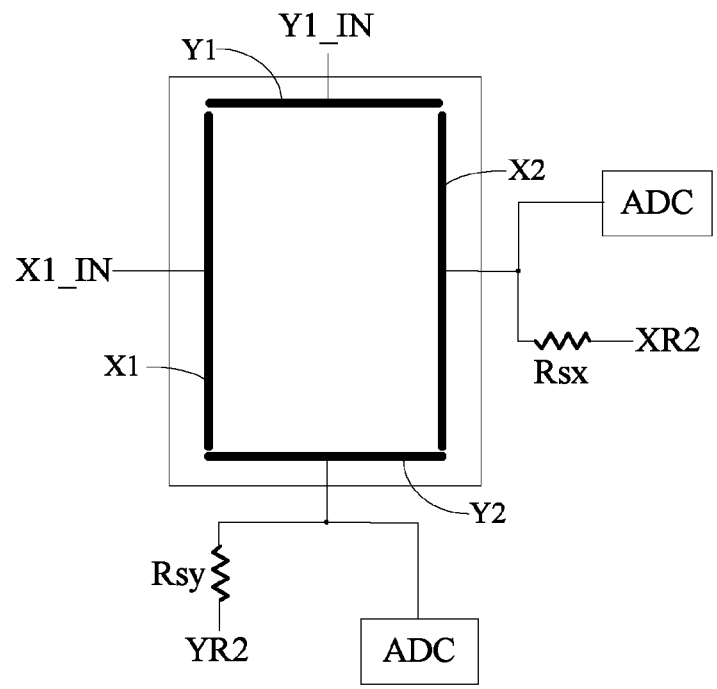
FIG. 5 schematically illustrates a circuit connection diagram of a touch screen according to one embodiment of the present disclosure.

Referring to FIG. 5, a first terminal of a first external resistor Rsx is connected with the second electrode X2 and a first terminal of a second external resistor Rsy is connected with the fourth electrode Y2.

Figure 6:
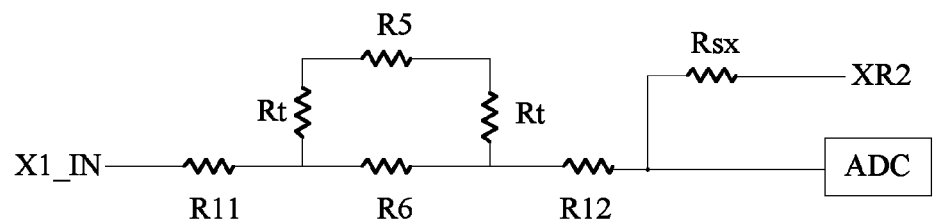
FIG. 6 schematically illustrates a resistance equivalent circuit in an X-axis direction of a touch screen having two points being touched according to one embodiment of the present disclosure.

FIG. 6 schematically illustrates a resistance equivalent circuit in an X-axis direction of a touch screen having two points being touched according to one embodiment of the present disclosure. The resistance from a touch point on a first resistive layer to a first electrode X1 is equivalent to an eleventh resistor R11 with resistance r11, the resistance from another touch point on the first resistive layer to a second electrode X2 is equivalent to a twelfth resistor R12 with resistance r12, the resistance between two touch points on the first resistive layer is equivalent to a sixth resistor R6 with resistance r6, the resistance between two touch points on a second resistive layer is equivalent to a fifth resistor R5 with resistance r5, and the single-contact resistance of each one of the two touch points between the first resistive layer and the second resistive layer is equivalent to a contact resistor Rt with resistance rt. The eleventh resistor R11, the sixth resistor R6 and the twelfth resistor R12 are in series with the first external resistor Rsx, the two contact resistors Rt are connected in series with the fifth resistor R5, and the two contact resistors Rt and the fifth resistor R5 in series connection are connected to two terminals of the sixth resistor R6 in parallel.

To obtain a resistance variation $\Delta Rx$ of the touch screen in the direction of the X-axis, the first electrode X1 may be connected to a high level through a first drive pin X1_IN and a second terminal XR2 of the first external resistor Rsx may be grounded, and the first terminal of the first external resistor Rsx may be further connected to an input terminal of an ADC which is configured to detect the voltage of the first external resistor Rsx.

When the touch screen is touched, the resistance of the touch screen in the direction of the X-axis may be determined based on the voltage of the first external resistor Rsx. And the resistance variation ΔRx of the touch screen in the direction of the X-axis may be the difference between the resistances of the touch screen in the direction of the X-axis when the touch screen is touched and not touched.

Similarly, to obtain a resistance variation ΔRy of the touch screen in a direction of a Y-axis, the third electrode Y1 may be connected to a high level through a third drive pin Y1_IN and a second terminal YR2 of the second external resistor Rsy may be grounded, and the first terminal of the second external resistor Rsy may be further connected to the input terminal of an ADC which is configured to detect the voltage of the second external resistor Rsy.

When the touch screen is touched, the resistance of the touch screen in the direction of the Y-axis may be determined based on the voltage of the second external resistor Rsy. And the resistance variation ΔRy of the touch screen in the direction of the Y-axis may be the difference between the resistances of the touch screen in the direction of the Y-axis when the touch screen is touched and not touched.

Based on the resistance variation ΔRx and ΔRy, the distances between the two touch points in the directions of the X-axis and Y-axis may be determined, respectively.

It is assumed that, the resistivity of the first resistive layer is Kx (a given value, the resistance of the first resistive layer divided by the width of the touch screen), the resistivity of the second resistive layer is Ky (a given value, the resistance of the second resistive layer divided by the width of the touch screen), the equivalent resistance of the touch screen in the direction of the X-axis when the touch screen is not touched is rx0, and the equivalent resistance of the touch screen in the direction of the X-axis when the touch screen is touched is rx.

Equations (1) to (5) may be obtained according to the equivalent circuit shown in FIG. 6.

$$rx0 = r11 + r12 + r6 \quad (1)$$

$$rx = r11 + r12 + \frac{r6*(r5 + 2*rt)}{r6 + r5 + 2*rt} \quad (2)$$

$$r6 = Kx^*\Delta x \quad (3)$$

$$r5 = Ky^*\Delta x \quad (4)$$

$$\Delta Rx = rx0 - rx \quad (5)$$

Combining Equations (1) to (5) and removing an invalid solution, Equation (6) may be obtained.

$$\Delta x = \frac{\Delta Rx(Kx+Ky) + \sqrt{(\Delta Rx(Kx+Ky))^2 + 8rt*\Delta Rx*Kx^2}}{2Kx^2} \quad (6)$$

It can be seen form Equation (6), the distance between the two touch points in the direction of the X-axis can be obtained based on the resistance variation ΔRx of the touch screen in the direction of the X-axis.

Similarly, by determining a resistance equivalent circuit of the touch screen in the direction of the Y-axis, Equation (7) may be obtained as follows:

$$\Delta y = \frac{\Delta Ry(Kx+Ky) + \sqrt{(\Delta Ry(Kx+Ky))^2 + 8rt*\Delta Ry*Ky^2}}{2Ky^2} \quad (7)$$

It can be seen form Equation (7), the distance between the two touch points in the direction of the Y-axis can be obtained based on the resistance variation ΔRy of the touch screen in the direction of the Y-axis.

In practice, to reduce the amount of computation, Equations (6) and (7) may be simplified. For example, perform approximation by using a first-order equation or a multi-order equation, or constructing an empirical formula using measured data to reduce parts with huge amount of computation, such as root operation.

In S3, based on the coordinates (Xc, Yc) of the associated point and the distances Δx and Δy between the two touch points in the directions of the X-axis and Y-axis, following indeterminate coordinates of the two touch points may be determined:

a first set of indeterminate coordinates are: (Xc−Δx/2, Yc−Δy/2), (Xc+Δx/2, Yc+Δy/2);

a second set of indeterminate coordinates are: (Xc−Δx/2, Yc+Δy/2), (Xc+Δx/2, Yc−Δy/2);

a third set of indeterminate coordinates are: (Xc, Yc−Δy/2), (Xc, Yc+Δy/2); and a fourth set of indeterminate coordinates are: (Xc−Δx/2, Yc), (Xc+Δx/2, Yc)

Among the four sets of indeterminate coordinates, only one set is the actual coordinates of the two touch points.

In S4, if the distance Δx between the two touch points in the direction of the X-axis is zero, the third set of indeterminate coordinates may be selected as the actual coordinates of the two touch points. If the distance Δy between the two touch points in the direction of the Y-axis is zero, the fourth set of indeterminate coordinates may be selected as the actual coordinates of the two touch points.

If neither the distance Δx between the two touch points in the direction of the X-axis nor the distance Δy between the two touch points in the direction of the Y-axis is zero, the selected set of indeterminate coordinates may define two touch points as: one touch point which is close to one electrode of one resistive layer which has a larger voltage and close to one electrode of the other resistive layer which is connected to a larger voltage when the other resistive layer is biased; and another touch point which is close to the other electrode of the one resistive layer which has a smaller voltage and close to the other electrode of the other resistive layer which is connected to a smaller voltage when the other resistive layer is biased.

Figure 7:
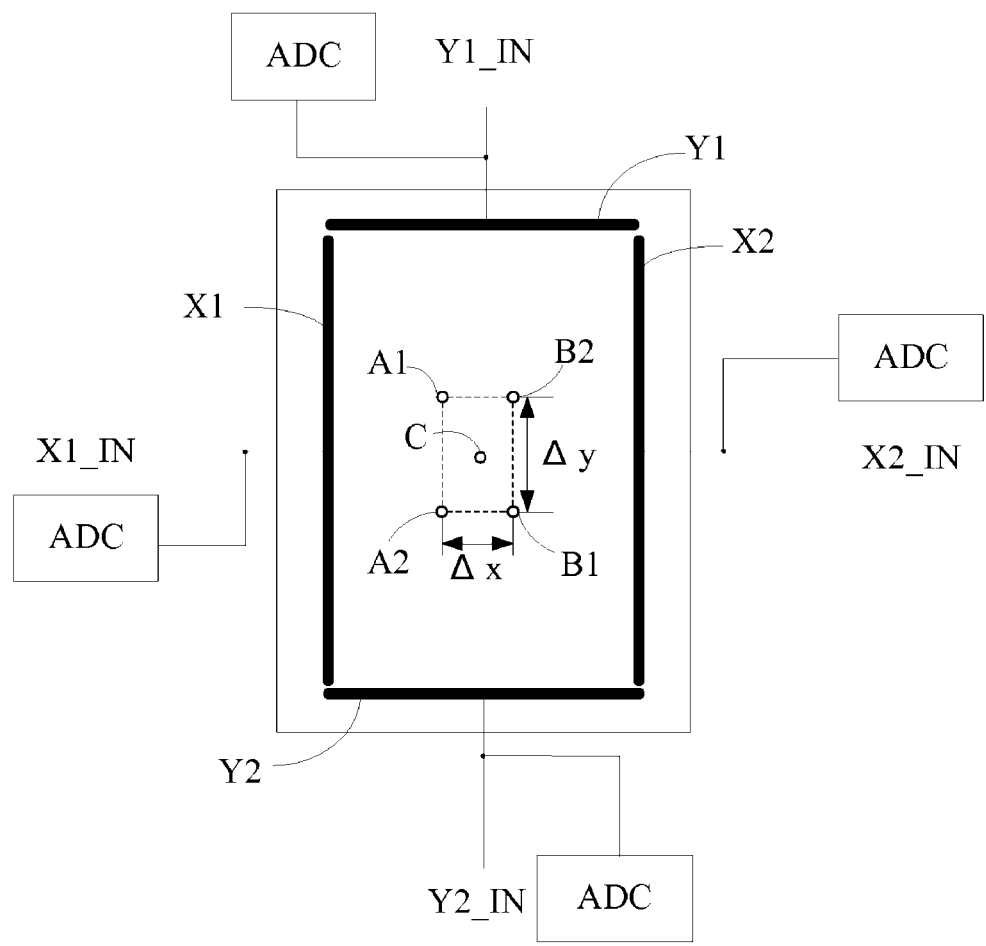
FIG. 7 schematically illustrates a touch screen having multi-touch points whose coordinates are to be determined according to one embodiment of the present disclosure.

Specifically, referring to FIG. 7, a first touch point A1 (Xc−Δx/2, Yc−Δy/2), a second touch point B1 (Xc+Δx/2, Yc+Δy/2), a third touch point A2 (Xc−Δx/2, Yc+Δy/2), a fourth touch point B2 (Xc+Δx/2, Yc−Δy/2) and an associated point C (Xc, Yc) are shown.

When the first resistive layer is biased, the first touch point A1 and the third touch point A2 are close to the first electrode X1 which is connected with the high level, and the second touch point B2 and the fourth touch point B2 are close to the second electrode X2 which is grounded. Therefore, the voltage of the first touch point A1 may be larger than that of the second touch point B1, and the voltage of the third touch point A2 may be larger than that of the fourth touch point B2.

Since the third electrode Y1 is closer to the first and fourth touch points than to the second and third touch points, the voltage of the third electrode Y1 measured by the ADC may be more approximate to the voltage of the first and fourth touch points. Since the fourth electrode Y2 is closer to the second and third touch points than to the first and fourth touch points, the voltage of the fourth electrode Y2 measured by the ADC may be more approximate to the voltage of the second and third touch points.

If the voltage of the third electrode Y1 measured by the ADC is larger than the voltage of the fourth electrode Y2 measured by the ADC, the first touch point A1 and the second touch point B1 may be the two touch points, that is, the first set of indeterminate coordinates may be the actual coordinates of the two touch points.

If the voltage of the third electrode Y1 measured by the ADC is smaller than the voltage of the fourth electrode Y2 measured by the ADC, the third touch point A2 and the fourth touch point B2 may be the two touch points, that is, the second set of indeterminate coordinates may be the actual coordinates of the two touch points.

Similarly, when the second resistive layer is biased, if the voltage of the first electrode X1 measured by the ADC is larger than the voltage of the second electrode X2 measured by the ADC, the first touch point A1 and the second touch point B1 may be the two touch points, that is, the first set of indeterminate coordinates may be the actual coordinates of the two touch points. If the voltage of the first electrode X1 measured by the ADC is smaller than the voltage of the fourth electrode X2 measured by the ADC, the third touch point A2 and the fourth touch point B2 may be the two touch points, that is, the second set of indeterminate coordinates may be the actual coordinates of the two touch points.

Therefore, by biasing either the first resistive layer or the second resistive layer, the actual coordinates of the two touch points may be obtained.

When the voltage of the third electrode Y1 measured by the ADC is larger than the voltage of the fourth electrode Y2 measured by the ADC, the first coordinate Xc1 is smaller than the second coordinate Xc2 in S1; and when the voltage of the third electrode Y1 measured by the ADC is smaller than the voltage of the fourth electrode Y2 measured by the ADC, the first coordinate Xc1 is greater than the second coordinate Xc2 in S1.

By comparing the first coordinate Xc1 and the second coordinate Xc2, the actual coordinates of the two touch points may be determined from the two sets of indeterminate coordinates. That is, when the first coordinate Xc1 is smaller than the second coordinate Xc2, the first set of indeterminate coordinates may be the actual coordinates of the two touch points; when the first coordinate Xc1 is greater than the second coordinate Xc2, the second set of indeterminate coordinates may be the actual coordinates of the two touch points.

Similarly, by comparing the third coordinate Yc1 and the fourth coordinate Yc2, the actual coordinates of the two touch points may be determined from the two sets of indeterminate coordinates. That is, when the third coordinate Yc1 is smaller than the fourth coordinate Yc2, the first set of indeterminate coordinates may be the actual coordinates of the two touch points; when the third coordinate Yc1 is greater than the fourth coordinate Yc2, the second set of indeterminate coordinates may be the actual coordinates of the two touch points.

In practice, the first, second, third and fourth coordinates may be calculated by a hardware acceleration module. In software, these coordinates may only need to be compared, which reduces the workload in software.

When the difference between the voltage of the third electrode Y1 and the voltage of the fourth electrode Y2 measured by the ADC is greater than the difference between the voltage of the first electrode X1 and the voltage of the second electrode X2 measured by the ADC, i.e., the difference between the first coordinate Xc1 and the second coordinate Xc2 is greater than the difference between the third coordinate Yc1 and the fourth coordinate Yc2, the actual coordinates of the two touch points may be determined according to the voltage of the third electrode Y1 and the voltage of the fourth electrode Y2 measured by the ADC by biasing the first resistive layer, which may increase the reliability of the actual coordinates obtained.

When the difference between the voltage of the third electrode Y1 and the voltage of the fourth electrode Y2 measured by the ADC is smaller than the difference between the voltage of the first electrode X1 and the voltage of the second electrode X2 measured by the ADC, i.e., the difference between the first coordinate Xc1 and the second coordinate Xc2 is smaller than the difference between the third coordinate Yc1 and the fourth coordinate Yc2, the actual coordinates of the two touch points may be determined according to the voltage of the first electrode X1 and the voltage of the second electrode X2 measured by the ADC by biasing the second resistive layer, which may increase the reliability of the actual coordinates obtained.

In some embodiments, the coordinates may be coordinates on a screen. For example, take one point on the touch screen as the origin and establish a coordinate system on a plane of the touch screen, such as a rectangular coordinate system or a polar coordinate system. In some embodiments, the coordinates may be actual distances and a unit thereof may be a unit of actual distances, such as millimeter. In some embodiments, the coordinates may be represented by pixels and a unit here may be the distance between pixels. For a polar coordinate system, one of the distances between the coordinates of the two touch points is the angular difference between the two touch points.

For example, a vertex of a top-left corner of the touch screen is taken as the origin, an X-axis is along the horizontal direction and a Y-axis is along the vertical direction. When taking an actual distance as a unit, coordinates (1, 1) may represent coordinates of a touch point which moves from the origin to the right by 1 mm and then moves downward by 1 mm. When taking a pixel as a unit, the coordinates (1, 1) may represent coordinates of a touch point which moves from the origin to the right by one pixel and then moves downward by one pixel.

An example touch detection method, where a touch screen having two points being touched, will be described in detail.

It is assumed that, two touch points are (10, 45), (40, 15), respectively; the resistance of a first resistive layer is 251.2Ω and the resistance of a second resistive layer is 421.2Ω; the resistance of a first external resistor Rsx is 100Ω, the resistance of a second external resistor Rsy is 100Ω and the resistance of a third external resistor is 50Ω; the distance between a first electrode X1 and a second electrode X2 is 45 mm and the distance between a third electrode Y1 and a fourth electrode Y2 is 63 mm; the resistivity Kx of the first resistive layer is 5.58222 (Kx=251.2Ω/45 mm) and the resistivity Ky of the second resistive layer is 6.684127 (Ky=421.1Ω/63 mm); and the resistance of a contact resistor Rt is 304Ω (Though the resistance of the contact resistor Rt may be changed according to the strength used in touch, the change has little effect on the result. Thus, the resistance of Rt is taken as a constant).

Figure 8:
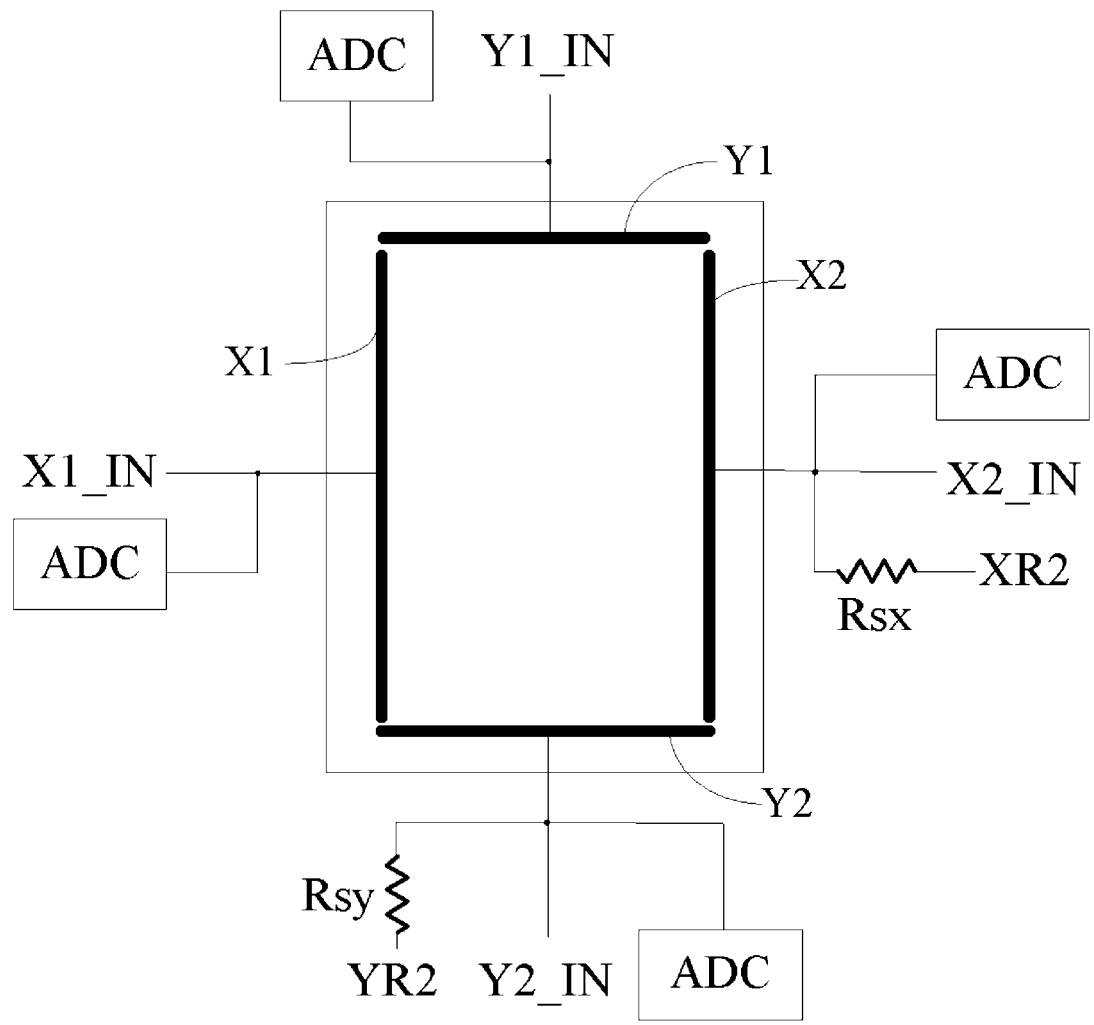
FIG. 8 schematically illustrates a circuit connection diagram of a touch screen according to another embodiment of the present disclosure.

Referring to FIG. 8, in S1, the first electrode X1 is connected to a high level of 3V through a first drive pin X1_IN; the second electrode X2 is grounded through a second drive pin X2_IN; the third electrode Y1 and the fourth electrode Y2 may be connected to different input terminals of an ADC and drive pins may be set to the high impedance state. For example, a third drive pin Y1_IN connected with the third electrode Y1, a fourth drive pin Y2_IN connected with the fourth electrode Y2, a drive pin connected with a second terminal XR2 of the first external resistor Rsx, and a drive pin connected with a second terminal YR2 of the second external resistor Rsy may be set to the high impedance state.

The voltages of the third electrode Y1 and the fourth electrode Y2 measured by the ADC are 1.27V and 1.40V respectively. Therefore, a first coordinate Xc1 and a second coordinate Xc2 of an associated point may be 25.95 mm and 24.0 mm. The average value of the first and second coordinates is 24.98 mm.

The third electrode Y1 is connected to a high level of 3V through the third drive pin Y1_IN; the fourth electrode Y2 is grounded through the fourth drive pin Y2_IN; the first electrode X1 and the second electrode X2 may be connected to different input terminals of an ADC and drive pins may be set to the high impedance state. For example, the first drive pin X1_IN connected with the first electrode X1, the second drive pin X2_IN connected with the second electrode X2, the drive pin connected with the second terminal XR2 of the first external resistor Rsx, and the drive pin connected with the second terminal YR2 of the second external resistor Rsy may be set to the high impedance state.

The voltages of the first electrode X1 and the second electrode X2 measured by the ADC are 1.47V and 1.67V respectively. Therefore, a third coordinate Yc1 and a fourth coordinate Yc2 of the associated point may be 29.93 mm and 32.13 mm. The average value of the third and fourth coordinates is 30.03 mm.

The average value of the first and second coordinates and the average value of the third and fourth coordinates are taken as the X coordinate and the Y coordinate of the associated point, respectively. Therefore, the associate point has coordinates (24.98 mm, 30.03 mm).

When a touch screen has two points being touched at a same time, the coordinates (24.98 mm, 30.03 mm) may be coordinates of a center point between the two touch points.

In S2, the first electrode X1 may be connected to a high level of 3V through the first drive pin X1_IN and the second terminal XR2 of the first external resistor Rsx may be grounded.

When the touch screen is not touched, the voltage of the first external resistor Rsx is measured to be 0.8542V and the resistance of the touch screen is 251.2Ω. When the touch screen is touched, the voltage of the first external resistor Rsx changes to 0.9282V and the resistance of the touch screen is calculated to be 223.2Ω according to the voltage of the first external resistor Rsx. Therefore, the resistance variation ΔRx of the touch screen in the direction of an X-axis may be represented as: ΔRx=251.2Ω−223.2Ω=28Ω.

According to Equation (6), the distance Δx between the two touch points in the direction of the X-axis is obtained as 29.5 mm. Similarly, according to Equation (7), the distance Δy between the two touch points in the direction of a Y-axis is obtained as 32.2 mm.

In S3, since neither the distance Δx between the two touch points in the direction of the X-axis nor the distance Δy between the two touch points in the direction of the Y-axis is zero, two sets of indeterminate coordinates of the two touch points may be obtained based on the coordinates of the associated point and the distances Δx and Δy:

a first set of indeterminate coordinates: (10.23 mm, 13.93 mm), (39.73 mm, 46.13 mm); and a second set of indeterminate coordinates: (10.23 mm, 46.13 mm), (39.73 mm, 13.93 mm).

From above, the difference between the first coordinate Xc1 and the second coordinate Xc2 is 1.95 mm and the difference between the third coordinate Yc1 and the fourth coordinate Yc2 is 2.2 mm. Therefore, according to S4, the actual coordinates may be determined based on the third coordinate Yc1 and the fourth coordinate Yc2.

Further, since the third coordinate Yc1 is smaller than the fourth coordinate Yc2, the actual coordinates of the two touch points may be determined to be the second set of indeterminate coordinate.

The maximum error between the determined actual coordinates (10.23 mm, 46.13 mm), (39.73 mm, 13.93 mm) which are obtained by embodiments of the present disclosure and the actual coordinates (10 mm, 45 mm), (40 mm, 15 mm) is only 1.13 mm, which is very small compared to the size of a finger.

Figure 9:
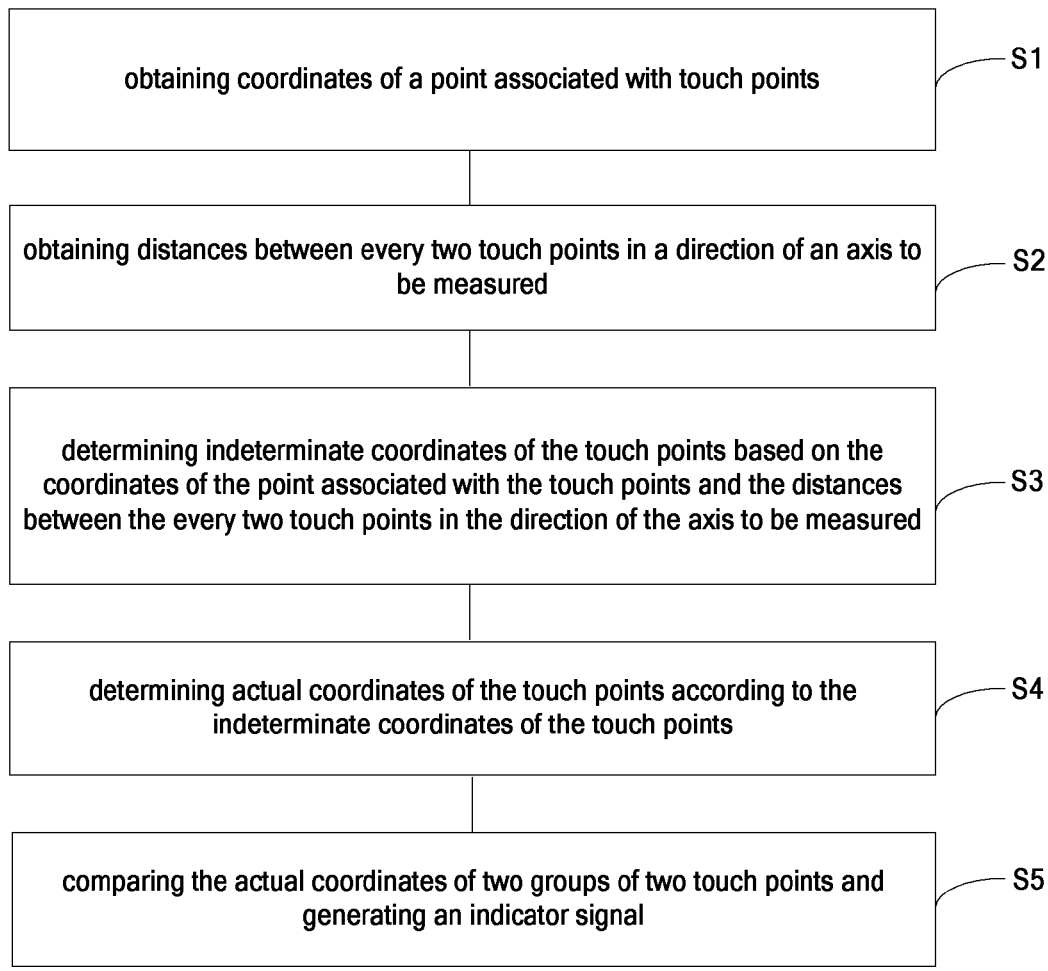
FIG. 9 schematically illustrates a flow chart of a touch detection method according to another embodiment of the present disclosure.

Referring to FIG. 9, in some embodiments, the touch detection method may further include S5: comparing the actual coordinates of two groups of two touch points and generating an indicator signal.

Specifically, comparing the actual coordinates of two groups of two touch points and generating an indicator signal may include: comparing the actual coordinates of the two groups of two touch points to determine a change of touch and generating the indicator signal, where the change of touch may include a change in angle or a change in distance.

The indicator signal may indicate at least one operation in a shortcut menu which includes zooming in, zooming out, rotation, page-turning, forward, backward, speeding up, slowing down and popping a current state.

Figure 10:
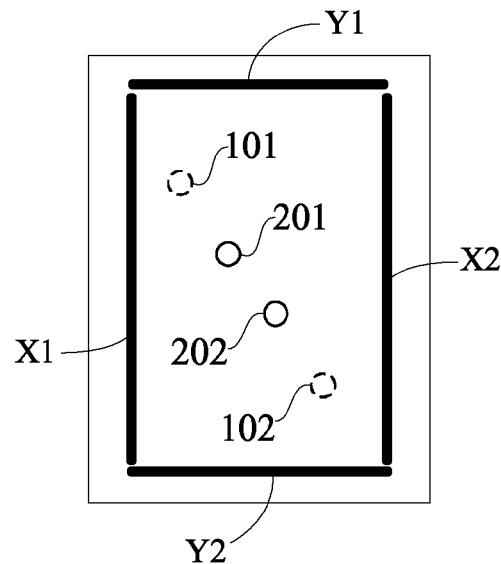
FIG. 10 schematically illustrates two groups of touch points on a touch screen according to one embodiment of the present disclosure.

Referring to FIG. 10, four touch points are shown, including: a first touch point 101, a second touch point 102, a third touch point 201 and a fourth touch point 202. The first and second touch points form a first group of two touch points exerted on the touch screen at a same time, the third and fourth touch points form a second group of two touch points exerted on the touch screen at a same time, and the first and second groups are not exerted on the touch screen at a same time.

When the first group of two touch points is exerted on the touch screen, according to S1 to S4, actual coordinates of the first touch point 101 and the second touch point 102 may be obtained as (11.2 mm, 21.4 mm), (34.1 mm, 51.6 mm), respectively.

When the second group of two touch points is exerted on the touch screen, according to S1 to S4, actual coordinates of the third touch point 201 and the fourth touch point 202 may be obtained as (15.7 mm, 31.1 mm), (23.7 mm, 42.1 mm), respectively.

The distance between the first touch point 101 and the second touch point 102 is 37.9 mm and the angle between a line determined by them and the X-axis is 52.8°. The distance between the third touch point 201 and the fourth touch point 202 is 13.6 mm and the angle between a line determined by them and the X-axis is 53.9°. The angle in the two groups is nearly not changed while the distance is decreased from the first group to the second group, thus, an indicator signal of zooming in is generated.

Figure 11:
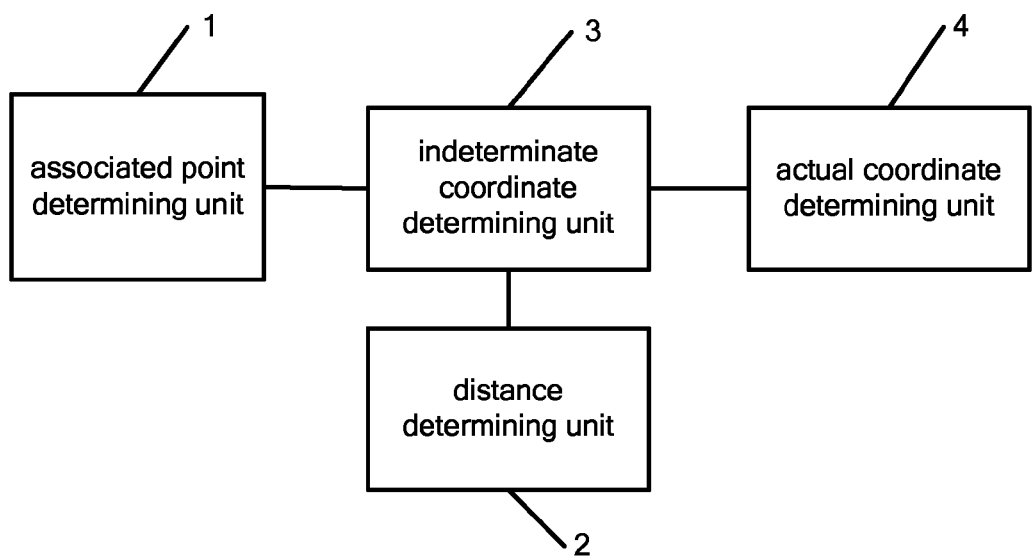
FIG. 11 schematically illustrates a structural diagram of a touch detection device according to one embodiment of the present disclosure.

Referring to FIG. 11, in one embodiment, a touch detection device is provided, including:

an associated point determining unit 1, adapted for obtaining coordinates of a point associated with touch points;

a distance determining unit 2, adapted for obtaining distances between the touch points in a direction of an axis to be measured;

an indeterminate coordinate determining unit 3, adapted for determining indeterminate coordinates of the touch points based on the coordinates of the point associated with the touch points and the distances between the touch points in the direction of the axis to be measured; and an actual coordinate determining unit 4, adapted for determining actual coordinates of the touch points according to the indeterminate coordinates of the touch points.

When the number of the touch points is two, the coordinates of the point associated with the touch points may include a coordinate on a first axis and a coordinate on a second axis. The coordinate on the first axis may be obtained based on at least one of a first coordinate and a second coordinate, where the first coordinate is relevant to the voltage of an electrode on a second resistive layer when a first resistive layer is biased, the second coordinate is relevant to the voltage of another electrode on a second resistive layer of a touch screen when a first resistive layer of the touch screen is biased. The coordinate on the second axis may be obtained based on at least one of a third coordinate and a fourth coordinate, where the third coordinate is relevant to the voltage of an electrode on the first resistive layer when the second resistive layer is biased and the fourth coordinate is relevant to the voltage of another electrode on the first resistive layer when the second resistive layer is biased.

The associated point determining unit 1 may include a bias unit. The bias unit may be adapted for applying a first voltage on one electrode on one of the two resistive layers and applying a second voltage on another electrode on the one of the two resistive layers. The first voltage is larger than the second voltage, for example, the first voltage is a high level greater than 0V and the second voltage is a ground voltage of 0V.

When the number of the touch points is two, the distance determining unit 2 may be adapted for measuring a voltage or current of an external resistor on each of the two resistive layers respectively, or measuring a voltage or current between electrodes on each of the two resistive layers respectively, so as to obtain resistance variations of the touch screen in directions of a first axis and a second axis; and determining the distances between the two touch points in the directions of the first axis and the second axis based on the resistance variations of the touch screen in the directions of the first axis and the second axis, respectively.

The difference between the resistances of the touch screen in the direction of the first axis or the second axis when the touch screen is touched or not touched may be taken as the resistance variation of the touch screen in the direction of the first axis or the second axis. The resistance of the touch screen in the direction of the first axis or the second axis when the touch screen is touched may be obtained by measuring the voltage or current of the external resistor on the first axis or the second axis, or by measuring the voltage or current between the electrodes on the first axis or the second axis.

The distance determining unit 2 may include a first distance determining sub-unit and a second distance determining sub-unit. The first distance determining sub-unit may be adapted for calculating the distance $\Delta x$ between two touch points in a direction of the first axis based on following equation:

$$\Delta x = \frac{\Delta Rx(Kx+Ky) + \sqrt{(\Delta Rx(Kx+Ky))^2 + 8rt*\Delta Rx*Kx^2}}{2Kx^2},$$

where $\Delta Rx$ represents a resistance variation of the touch screen on the first axis, Kx, Ky are two resistivity of the two resistive layers, and rt is the resistance of a single-contact resistor of the touch screen.

The second distance determining sub-unit may be adapted for calculating the distance $\Delta y$ between two touch points in a direction of the second axis based on following equation:

$$\Delta y = \frac{\Delta Ry(Kx+Ky) + \sqrt{(\Delta Ry(Kx+Ky))^2 + 8rt*\Delta Ry*Ky^2}}{2Ky^2},$$

where $\Delta Ry$ represents a resistance variation of the touch screen on the second axis.

In practice, to reduce the amount of computation, the above two equations may be simplified. For example, perform approximation by using a first-order equation or a multi-order equation, or constructing an empirical formula using measured data to reduce parts with huge amount of computation, such as root operation.

When the number of the touch points is two, indeterminate coordinates of the touch points include two sets of indeterminate coordinates, each set including indeterminate coordinates of the two touch points. The actual coordinate determining unit 4 may be adapted for selecting one set of indeterminate coordinates as actual coordinates of the two touch points based on the voltage of two electrodes on the first resistive layer or the voltages of two electrodes on the second resistive layer. The voltages of the two electrodes on the first resistive layer may be the voltages of the two electrodes on the first resistive layer when the second resistive layer is biased, and the voltages of the two electrodes on the second resistive layer may be the voltages of the two electrodes on the second resistive layer when the first resistive layer is biased.

The actual coordinate determining unit 4 may include a first actual coordinate determining sub-unit. The first actual coordinate determining sub-unit is adapted for selecting one set of indeterminate coordinates as the actual coordinates of the two touch points according to the voltages of the two electrodes on the first resistive layer, when the difference between the voltages of the two electrodes on the first resistive layer is greater than the difference between the voltages of the two electrodes on the second resistive layer.

The actual coordinate determining unit 4 may further include a second actual coordinate determining sub-unit. The first actual coordinate determining sub-unit is adapted for selecting one set of indeterminate coordinates as the actual coordinates of the two touch points according to the voltages of the two electrodes on the second resistive layer, when the difference between the voltages of the two electrodes on the second resistive layer is greater than the difference between the voltages of the two electrodes on the first resistive layer.

The selected set of indeterminate coordinates may define two touch points as: one touch point which is close to one electrode of one resistive layer which has a larger voltage and close to one electrode of the other resistive layer which is connected to a high level when the other resistive layer is biased; and another touch point which is close to the other electrode of the one resistive layer which has a smaller voltage and close to the other electrode of the other resistive layer which is grounded when the other resistive layer is biased.

Figure 12:
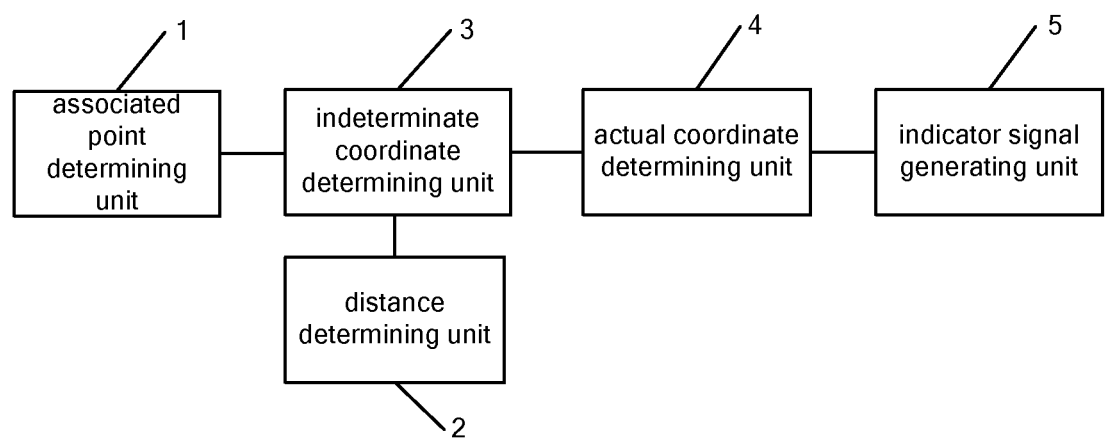
FIG. 12 schematically illustrates a structural diagram of a touch detection device according to another embodiment of the present disclosure.

Referring to FIG. 12, in some embodiments, the touch detection device may further include an indicator signal generating unit 5, adapted for comparing the indeterminate coordinates of two groups of two touch points generated in the actual coordinate determining unit 4 and generating an indicator signal.

The indicator signal generating unit 5 may include: a comparing sub-unit, adapted for comparing the actual coordinates of two groups of two touch points to determine a change of touch, where the change of touch may include a change in angle or a change in distance; and a generating sub-unit, adapted for generating the indicator signal based on the change of touch.

The indicator signal may indicate at least one operation in a shortcut menu which includes: zooming in, zooming out, rotation, page-turning, forward, backward, speeding up, slowing down and popping a current state.

Those skilled in the art can understand: the units or sub units of the touch detection device in the above embodiments may be realized by programs instructing corresponding hardware or by an embedded system with a combination of software and hardware. The programs may be stored in a storage medium in an electrical device, such as Read-Only Memory (ROM), Random Access Memory (RAM), Flash, memory card, diskette and compact disc.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A touch detection method, comprising: obtaining coordinates of a point associated with touch points; obtaining distances between the touch points in a direction of an axis to be measured; determining indeterminate coordinates of the touch points based on the coordinates of the point associated with the touch points and the distances between the touch points in the direction of the axis to be measured; and determining actual coordinates of the touch points according to the indeterminate coordinates of the touch points, wherein the number of the touch points is two, indeterminate coordinates of the touch points comprise two sets of indeterminate coordinates, each set comprises indeterminate coordinates of the two touch points, and determining actual coordinates of the touch points according to the indeterminate coordinates of the touch points comprises: selecting one set of indeterminate coordinates as the actual coordinates of the two touch points based on voltages of two electrodes on a first resistive layer of a touch screen or voltages of two electrodes on a second resistive layer of the touch screen, where the voltages of the two electrodes on the first resistive layer are the voltages of the two electrodes on the first resistive layer when the second resistive layer is biased, and the voltages of the two electrodes on the second resistive layer are the voltages of the two electrodes on the second resistive layer when the first resistive layer is biased;

wherein selecting one set of indeterminate coordinates as the actual coordinates of the two touch points based on the voltages of two electrodes on the first resistive layer or the voltages of two electrodes on the second resistive layer comprises:

when the difference between the voltages of the two electrodes on the first resistive layer is greater than the difference between the voltages of the two electrodes on the second resistive layer, selecting one set of indeterminate coordinates as the actual coordinates of the two touch points according to the voltages of the two electrodes on the first resistive layer.

2. The method according to claim 1, further comprising: comparing actual coordinates of two groups of the touch points and generating an indicator signal.

3. The method according to claim 2, wherein comparing the actual coordinates of two groups of the touch points and generating an indicator signal comprises: comparing the actual coordinates of the two groups of the touch points to determine a change of touch and generating the indicator signal, where the change of touch comprises a change in angle or a change in distance.

4. The method according to claim 2, wherein the indicator signal indicates performing at least one operation in a shortcut menu which comprises zooming in, zooming out, rotation, page-turning, forward, backward, speeding up, slowing down and popping a current state.

5. The method according to claim 1, wherein the coordinates of the point associated with the touch points comprise a coordinate on a first axis and a coordinate on a second axis, where the coordinate on the first axis is obtained based on at least one of a first coordinate and a second coordinate, the first coordinate is relevant to the voltage of an electrode on the second resistive layer of the touch screen when the first resistive layer of the touch screen is biased, and the second coordinate is relevant to the voltage of another electrode on the second resistive layer when the first resistive layer is biased, and where the coordinate on the second axis is obtained based on at least one of a third coordinate and a fourth coordinate, the third coordinate is relevant to the voltage of an electrode on the first resistive layer when the second resistive layer is biased, and the fourth coordinate is relevant to the voltage of another electrode on the first resistive layer when the second resistive layer is biased.

6. The method according to claim 5, wherein biasing a resistive layer comprises:

applying a first voltage on an electrode on the first or second resistive layer; and applying a second voltage on another electrode on the first or second resistive layer, where the first voltage is larger than the second voltage.

7. The method according to claim 1, wherein the obtaining distances between the touch points in a direction of an axis to be measured comprises:

measuring a voltage or current of an external resistor on each of the two resistive layers, respectively, or measuring a voltage or current between electrodes on each of the two resistive layers, respectively, so as to obtain resistance variations of the touch screen in directions of a first axis and a second axis; and determining distances between the two touch points in the directions of the first axis and the second axis based on the resistance variations of the touch screen in the directions of the first axis and the second axis, respectively.

8. The method according to claim 7, wherein the resistance variation of the touch screen in the direction of the first axis or the second axis is the difference between the resistances of the touch screen in the direction of the first axis or the second axis when the touch screen is touched or not touched, and the resistance of the touch screen in the direction of the first axis or the second axis when the touch screen is touched is obtained by measuring the voltage or current of the external resistor on the first or resistive layer, or by measuring the voltage or current between the electrodes on the first or second resistive layer.

9. The method according to claim 7, wherein determining the distances between the two touch points in the directions of the first axis and the second axis based on the resistance variations of the touch screen in the directions of the first axis and the second axis, respectively, comprises:
calculating a distance Δx between the two touch points in a direction of the first axis based on following equation:

$$\Delta x = \frac{\Delta Rx(Kx+Ky) + \sqrt{(\Delta Rx(Kx+Ky))^2 + 8rt*\Delta Rx*Kx^2}}{2Kx^2},$$

where ΔRx represents a resistance variation of the touch screen on the first axis, Kx, Ky are two resistivity of the two resistive layers, and rt is the resistance of a single-contact resistor of the touch screen, and
calculating a distance Δy between the two touch points in a direction of the second axis based on following equation:

$$\Delta y = \frac{\Delta Ry(Kx+Ky) + \sqrt{(\Delta Ry(Kx+Ky))^2 + 8rt*\Delta Ry*Ky^2}}{2Ky^2},$$

where ΔRy represents a resistance variation of the touch screen on the second axis.

10. The method according to claim 1, wherein selecting one set of indeterminate coordinates as the actual coordinates of the two touch points based on the voltages of two electrodes on the first resistive layer or the voltages of two electrodes on the second resistive layer comprises:
when the difference between the voltages of the two electrodes on the second resistive layer is greater than the difference between the voltages of the two electrodes on the first resistive layer, selecting one set of indeterminate coordinates as the actual coordinates of the two touch points according to the voltages of the two electrodes on the second resistive layer.

11. The method according to claim 1, wherein the selected set of indeterminate coordinates defines two touch points as: one touch point which is close to one electrode of one resistive layer which has a larger voltage and close to one electrode of the other resistive layer which is connected to a high level when the other resistive layer is biased; and another touch point which is close to the other electrode of the one resistive layer which has a smaller voltage and close to the other electrode of the other resistive layer which is grounded when the other resistive layer is biased.

12. A touch detection device, comprising: an associated point determining unit, adapted for obtaining coordinates of a point associated with touch points; a distance determining unit, adapted for obtaining distances between the touch points in a direction of an axis to be measured; an indeterminate coordinate determining unit, adapted for determining indeterminate coordinates of the touch points based on the coordinates of the point associated with the touch points and distances between the touch points in the direction of the axis to be measured; and an actual coordinate determining unit, adapted for determining actual coordinates of the touch points according to the indeterminate coordinates of the touch points, wherein the number of the touch points is two, indeterminate coordinates of the touch points comprise two sets of indeterminate coordinates, each set comprises indeterminate coordinates of the two touch points, and determining actual coordinates of the touch points according to the indeterminate coordinates of the touch points comprises: selecting one set of indeterminate coordinates as the actual coordinates of the two touch points based on voltages of two electrodes on a first resistive layer of a touch screen or voltages of two electrodes on a second resistive layer of the touch screen, where the voltages of the two electrodes on the first resistive layer are the voltages of the two electrodes on the first resistive layer when the second resistive layer is biased, and the voltages of the two electrodes on the second resistive layer are the voltages of the two electrodes on the second resistive layer when the first resistive layer is biased;
wherein the actual coordinate determining unit comprises a first actual coordinate determining unit, adapted for selecting one set of indeterminate coordinates as the actual coordinates of the two touch points according to the voltages of the two electrodes on the first resistive layer, when
the difference between the voltages of the two electrodes on the first resistive layer is greater than the difference between the voltages of the two electrodes on the second resistive layer.

13. The touch detection device according to claim 12, further comprising an indicator signal generating unit, adapted for comparing actual coordinates of two groups of the touch points and generating an indicator signal.

14. The touch detection device according to claim 13, wherein the indicator signal generating unit comprises:
a comparing sub-unit, adapted for comparing the actual coordinates of the two groups of the touch points to determine a change of touch, where the change of touch comprises a change in angle or a change in distance; and
a generating sub-unit, adapted for generating the indicator signal based on the change of touch.

15. The touch detection device according to claim 13, wherein the indicator signal indicates performing at least one operation in a shortcut menu which comprises zooming in, zooming out, rotation, page-turning, forward, backward, speeding up, slowing down and popping a current state.

16. The touch detection device according to claim 12, wherein the coordinates of the point associated with the touch points comprise a coordinate on a first axis and a coordinate on a second axis,
where the coordinate on the first axis is obtained based on at least one of a first coordinate and a second coordinate, the first coordinate is relevant to the voltage of an electrode on the second resistive layer of the touch screen when the first resistive layer of the touch screen is biased, the second coordinate is relevant to the voltage of another electrode on the second resistive layer when the first resistive layer is biased,
and where the coordinate on the second axis is obtained based on at least one of a third coordinate and a fourth coordinate, the third coordinate is relevant to the voltage of an electrode on the first resistive layer when the second resistive layer is biased, and the fourth coordinate is relevant to the voltage of another electrode on the first resistive layer when the second resistive layer is biased.

17. The touch detection device according to claim 16, wherein the associated point determining unit comprises a bias unit, adapted for applying a first voltage on an electrode on the first or second resistive layer and applying a second voltage on another electrode on the first or second resistive layer, where the first voltage is larger than the second voltage.

18. The touch detection device according to claim 12, wherein the distance determining unit is adapted for:
   measuring a voltage or current of an external resistor on each of the two resistive layers, respectively, or measuring a voltage or current between electrodes on each of the two resistive layers, respectively, so as to obtain resistance variations of the touch screen in directions of a first axis and a second axis; and
   determining distances between the two touch points in the directions of the first axis and the second axis based on the resistance variations of the touch screen in the directions of the first axis and the second axis, respectively.

19. The touch detection device according to claim 18, wherein the resistance variation of the touch screen in the direction of the first axis or the second axis is the difference between the resistances of the touch screen in the direction of the first axis or the second axis when the touch screen is touched or not touched, and the resistance of the touch screen in the direction of the first axis or the second axis when the touch screen is touched is obtained by measuring the voltage or current of the external resistor on the first or second resistive layer, or by measuring the voltage or current between the electrodes on the first or second resistive layer.

20. The touch detection device according to claim 18, wherein the distance determining unit comprises:
   a first distance determining sub-unit, adapted for calculating a distance $\Delta x$ between the two touch points in a direction of the first axis based on following equation:

$$\Delta x = \frac{\Delta Rx(Kx+Ky) + \sqrt{(\Delta Rx(Kx+Ky))^2 + 8rt*\Delta Rx*Kx^2}}{2Kx^2},$$

where $\Delta Rx$ represents a resistance variation of the touch screen on the first axis, Kx, Ky are two resistivity of the two resistive layes, and rt is the resistance of a single-contact resistor of the touch screen, and a second distance determining sub-unit, adapted for calculating a distance $\Delta y$ between the two touch points in a direction of the second axis based on following equation:

$$\Delta y = \frac{\Delta Ry(Kx+Ky) + \sqrt{(\Delta Ry(Kx+Ky))^2 + 8rt*\Delta Ry*Ky^2}}{2Ky^2},$$

where $\Delta Ry$ represents a resistance variation of the touch screen on the second axis.

21. The touch detection device according to claim 12, wherein the actual coordinate determining unit comprises a second actual coordinate determining unit, adapted for selecting one set of indeterminate coordinates as the actual coordinates of the two touch points according to the voltages of the two electrodes on the second resistive layer, when the difference between the voltages of the two electrodes on the second resistive layer is greater than the difference between the voltages of the two electrodes on the first resistive layer.

22. The touch detection device according to claim 12, wherein the selected set of indeterminate coordinates defines two touch points as: one touch point which is close to one electrode of one resistive layer which has a larger voltage and close to one electrode of the other resistive layer which is connected to a high level when the other resistive layer is biased; and another touch point which is close to the other electrode of the one resistive layer which has a smaller voltage and close to the other electrode of the other resistive layer which is grounded when the other resistive layer is biased.

* * * * *